United States Patent
Crouse

(10) Patent No.: US 9,073,677 B2
(45) Date of Patent: Jul. 7, 2015

(54) DUAL HEAD METAL LOCKING TIE

(71) Applicant: Panduit Corp., Tinley Park, IL (US)

(72) Inventor: Andrew Crouse, Woodridge, IL (US)

(73) Assignee: Panduit Corp., Tinley Park, IL (US)

( * ) Notice: Subject to any disclaimer, the term of this patent is extended or adjusted under 35 U.S.C. 154(b) by 240 days.

(21) Appl. No.: 13/774,254

(22) Filed: Feb. 22, 2013

(65) Prior Publication Data

US 2014/0237772 A1 Aug. 28, 2014

(51) Int. Cl.
*B65D 63/08* (2006.01)
*B65D 63/06* (2006.01)
*F16L 3/233* (2006.01)

(52) U.S. Cl.
CPC .............. *B65D 63/06* (2013.01); *Y10T 24/1461* (2015.01); *F16L 3/233* (2013.01); *B65D 63/08* (2013.01)

(58) Field of Classification Search
CPC ...................................................... F16L 3/221
USPC ............................... 24/20 R, 21, 25; 248/74.3
See application file for complete search history.

(56) References Cited

U.S. PATENT DOCUMENTS

| 147,015 | A | * | 2/1874 | Mclean ............................. 24/21 |
| 196,432 | A | | 10/1877 | Champan |
| 3,257,694 | A | | 6/1966 | Litwin |
| 3,528,142 | A | | 9/1970 | Lodholm |
| 3,654,669 | A | | 4/1972 | Fulton |
| 3,754,303 | A | | 8/1973 | Pollock |
| 3,833,969 | A | | 9/1974 | Hollingsworth et al. |
| 4,399,592 | A | | 8/1983 | Chopp, Jr. et al. |
| 4,473,925 | A | | 10/1984 | Jansen |
| 4,587,692 | A | | 5/1986 | Kaderabek |
| 4,887,334 | A | | 12/1989 | Jansen et al. |
| 5,291,637 | A | * | 3/1994 | Meyers ............................ 24/25 |
| 6,119,314 | A | | 9/2000 | Freed |
| 6,364,257 | B1 | * | 4/2002 | Holder ......................... 248/74.3 |
| 6,668,427 | B2 | | 12/2003 | Bulanda et al. |
| 7,131,168 | B2 | | 11/2006 | Pangallo |
| D570,673 | S | | 6/2008 | Geiger et al. |
| 7,437,804 | B1 | | 10/2008 | Geiger et al. |
| 7,603,751 | B2 | | 10/2009 | Caveney et al. |
| 7,854,414 | B2 | | 12/2010 | Head et al. |
| 2004/0016085 | A1 | | 1/2004 | Caveney |
| 2008/0178434 | A1 | * | 7/2008 | Bulanda ........................... 24/25 |
| 2012/0124783 | A1 | | 5/2012 | DeBerry et al. |

* cited by examiner

*Primary Examiner* — Jack W Lavinder
(74) *Attorney, Agent, or Firm* — Christopher S. Clancy; Aimee E. McVady

(57) ABSTRACT

The present invention is directed to a metal locking tie having a dual head that secures two different bundles using one tie. The dual head locking tie includes a top head, a bottom head, and a tie body. A first end of the tie body attaches to the bottom head and extends through a bottom strap passageway. The tie body wraps around a first bundle, extends through the top strap passageway of the dual head, wraps around a second bundle, and extends back through the bottom strap passageway of the dual head to secure two different bundles.

10 Claims, 7 Drawing Sheets

DUAL HEAD METAL LOCKING TIE

FIELD OF THE INVENTION

The present invention relates to a metal locking tie, and more particularly to a dual head metal locking tie.

BACKGROUND OF THE INVENTION

Metallic bundling devices incorporating locking balls and roller pins have been used for bundling bales of cotton or the like since the Nineteenth Century. None of the prior art devices were positive locking, i.e. depending on the orientation of the locking head, gravity could hold the ball out of locking engagement with the strap resulting in release. U.S. Pat. No. 4,399,592 addressed this problem by teaching the addition of a raised portion or protuberance for deflecting the threaded strap away from the floor as the threaded strap exits the locking head. This deflection ensures that the locking ball is in continuous engagement with the threaded strap regardless of the position of the ball or the orientation of the locking head. The prior metallic bundling devices, however, are designed to only secure one bundle.

It would be desirable to provide an improved metal locking tie that secures two different bundles using only one tie.

SUMMARY OF THE INVENTION

The present invention is directed to a metal locking tie having a dual head that secures two different bundles using one tie. The dual head includes a top head and a bottom head. A first end of the tie body is secured to the floor of the bottom head. The second end of the tie body wraps around a first bundle, extends through a top strap passageway of the dual head, wraps around a second bundle, and extends through the bottom strap passageway of the dual head. Once the tie is tensioned around the bundles, the tie body is cutoff.

DETAILED DESCRIPTION

Figure 1:
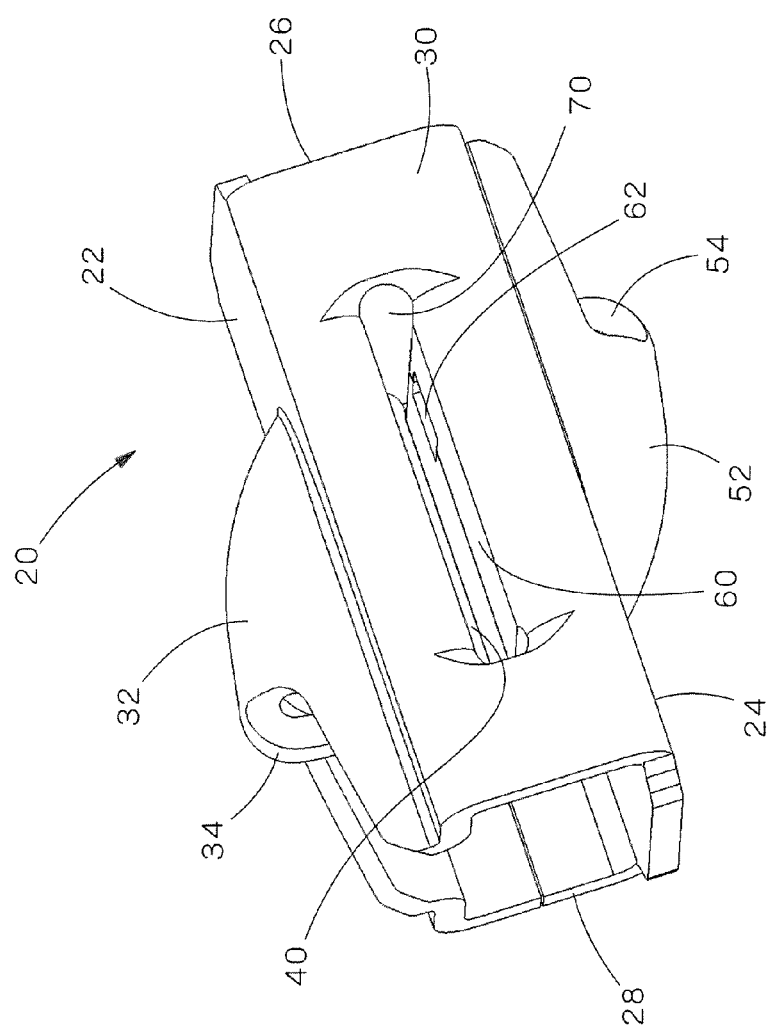
FIG. 1 is a perspective view of the dual head of the metal locking tie of the present invention.
Figure 2:
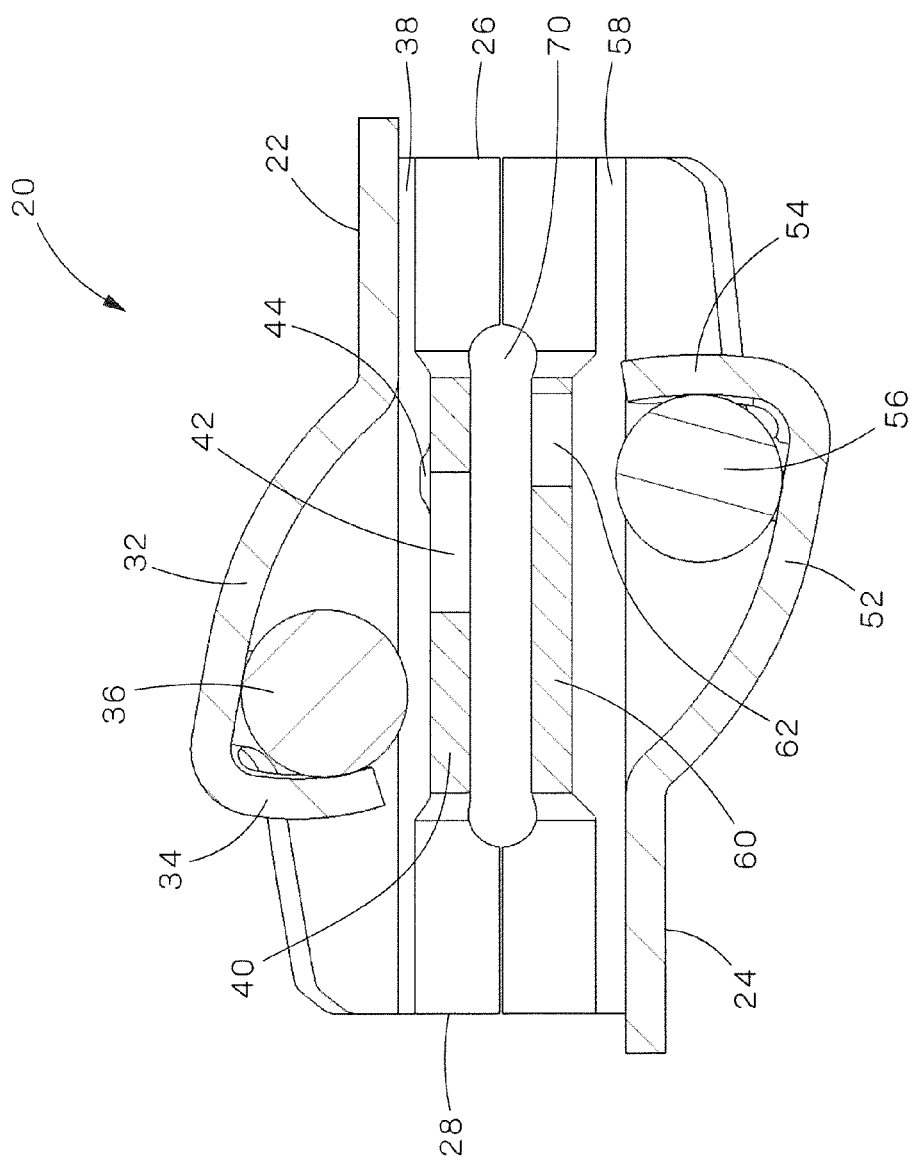
FIG. 2 is a cross sectional view of the dual head of FIG. 1.

FIGS. 1 and 2 illustrate the dual head of the metal locking tie of the present invention. The dual head 20 includes a top head 22 and a bottom head 24. The dual head 20 also includes an entrance end 26, an exit end 28, and sides 30.

The top head 22 includes a roof 32 with a finger 34 for maintaining a locking ball 36 positioned therein. A top strap passageway 38 extends from the entrance end 26 to the exit end 28 in the top head 22. The top head 22 includes a top head floor 40 with a hole 42 and two dimples 44 extending from the top head floor 40 into the top strap passageway 38. Although the top head floor 40 includes two dimples 44, the top head floor 40 could be designed with one or more dimples 44, as desired.

The bottom head 24 includes a roof 52 with a finger 54 for maintaining a locking ball 56 positioned therein. A bottom strap passageway 58 extends from the entrance end 26 to the exit end 28 in the bottom head 24. The bottom head 24 includes a bottom head floor 60 with a window 62. The top head 22 is positioned over the bottom head 24 with the top head floor 40 on the bottom head floor 60 and the roof 32 of the top head 22 extending in a direction that is opposite the roof 52 of the bottom head 24. As illustrated in FIGS. 1 and 2, a gap 70 is created between the top head floor 40 and the bottom head floor 60.

Figure 3:
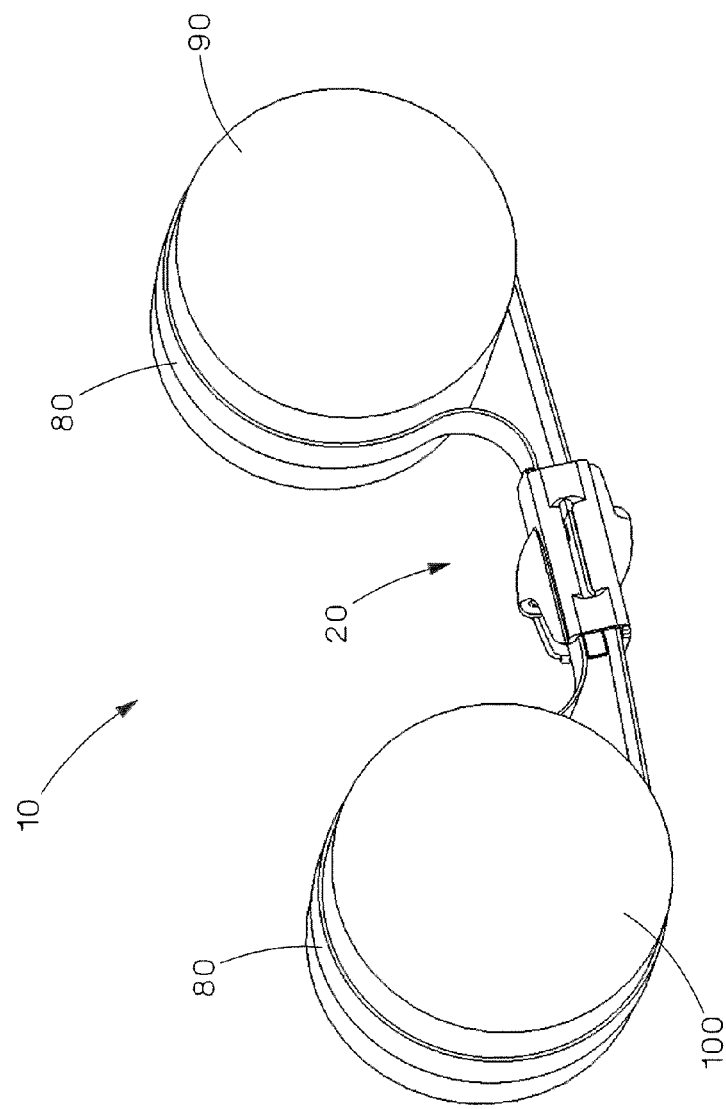
FIG. 3 is a perspective view of the metal locking tie with the dual head of FIG. 1 installed around two different bundles.
Figure 4:
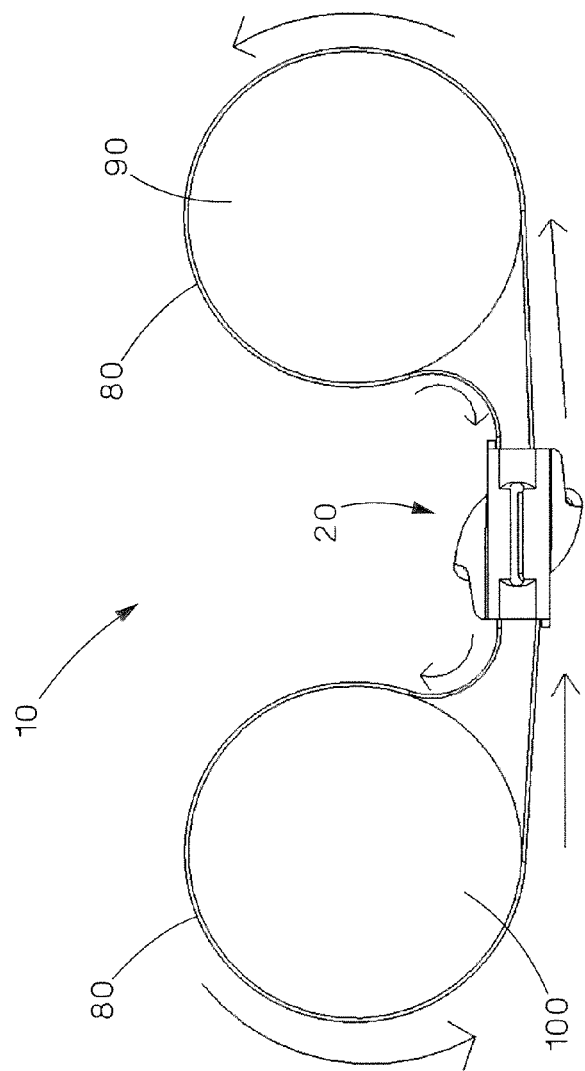
FIG. 4 is a side view of the metal locking tie with the dual head of FIG. 3 installed around two different bundles.
Figure 5:
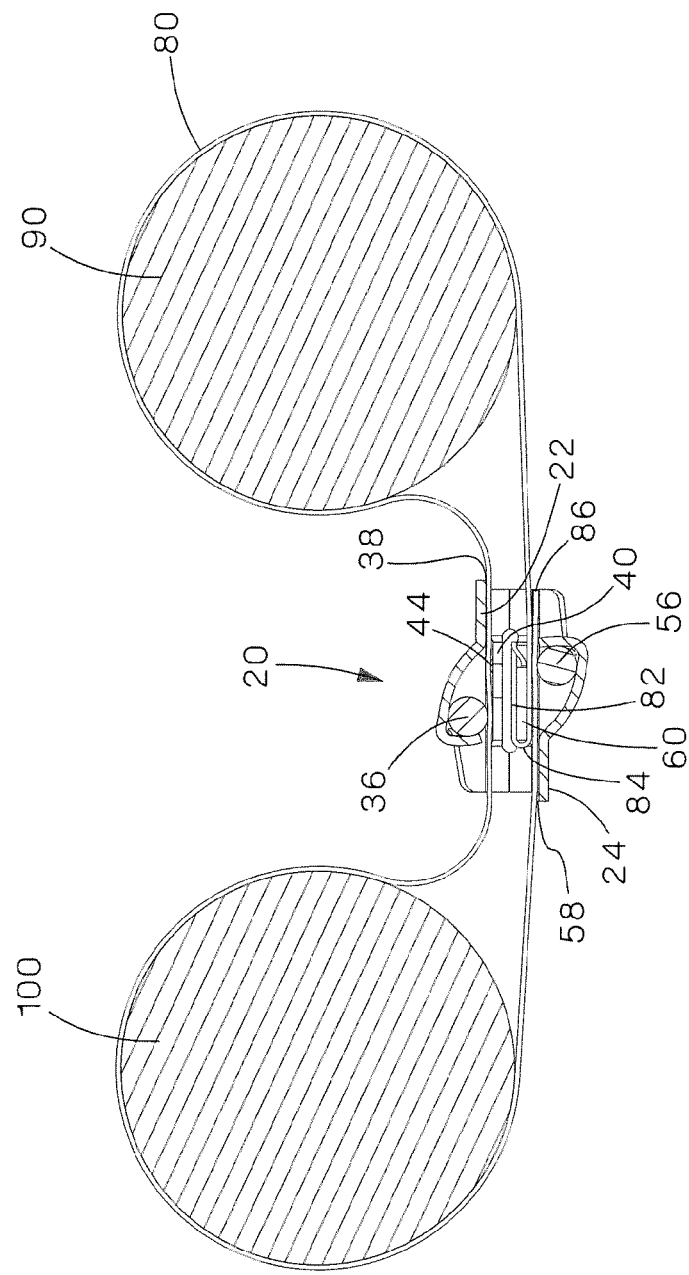
FIG. 5 is a cross sectional view of the metal locking tie with the dual head of FIG. 4 installed around two different bundles.

FIGS. 3-5 illustrate the dual head 20 of FIGS. 1 and 2 with a tie body 80 installed therein. The first end 82 of the tie body 80 attaches to the dual head 20 by bending a tab 84 around the bottom head floor 60 (see FIG. 5). After wrapping around a first bundle 90, the tie body 80 is thread into the top strap passageway 38 of the top head 22 between the dimple 44 and the locking ball 36. The dimple 44 in the top head floor 40 creates an interference fit between the locking ball 36 and the tie body 80. After the tie body 80 is wrapped around a second bundle 100, the tie body 80 is thread into the bottom strap passageway 58 of the bottom head 24 between the existing tie body 80 and the locking ball 56. Once the tie body 80 has been threaded in the dual head 20, a tool tightens the tie body 80 around the bundles 90, 100 and the excess tie body is cutoff to create a second end 86 with a flush cutoff.

The dual head 20 may be manufactured as a single piece or as multiple pieces that are then assembled together. The single piece design could be stamped and then folded leaving a gap between the two heads. The single piece design could also be metal injection molded. Once molded, the locking balls would be inserted in the heads and the fingers would be bent down to secure the locking balls. Alternatively, two separate heads could be produced with the head floors affixed to each other by adhesion, fastening, or welding.

Figure 6:
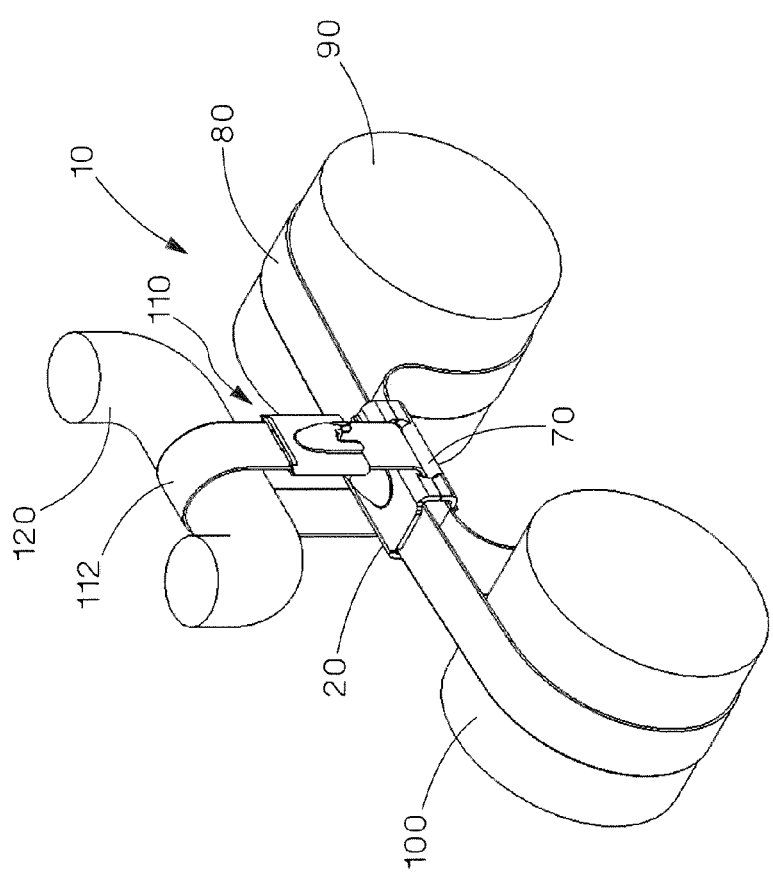
FIG. 6 is a perspective view of the metal locking tie with the dual head of FIG. 3 with a hanger secured to the dual head.
Figure 7:
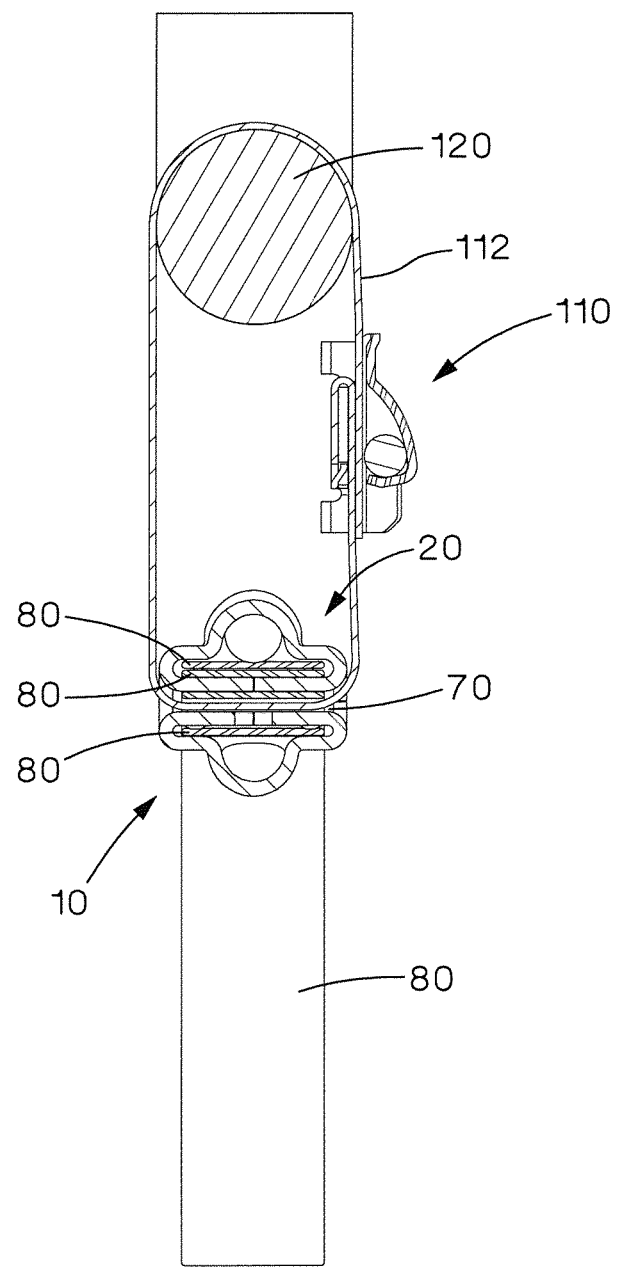
FIG. 7 is a partial cross sectional view of the metal locking tie with the dual head of FIG. 6.

FIGS. 6 and 7 illustrate the dual head metal locking tie 10 secured around two bundles 90, 100 and a second standard metal locking tie 110 threaded through the gap 70. The gap 70 is wider than the width of the tie body 80 of the dual head metal locking tie 10. As illustrated in FIGS. 6 and 7, the tie body 112 of a standard metal locking tie 110 can be installed through the gap 70 between the dual head 20. The gap 70 is tall enough to allow multiple loops of the tie body 112 through the gap 70, if desired. The standard metal locking tie 110 may be wrapped around any support 120 or hanger, as illustrated in FIG. 6, to secure the bundles 90, 100.

The dual head metal locking tie 10 of the present invention separates two different bundles 90, 100 with the use of only one tie body 80. The dual head metal locking tie 10 provides a high strength alternative to existing plastic ties.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

What is claimed is:

1. A metal locking tie comprising:
   a dual head having a top head, a bottom head, an entrance end, an exit end, and sides;

wherein the top head having a roof with a finger, a locking ball, a top head floor, and a top strap passageway extending from the entrance end to the exit end, the top strap passageway defined by the roof and the top head floor;

wherein the bottom head having a roof with a finger, a locking ball, a bottom head floor, and a bottom strap passageway extending from the entrance end to the exit end, the bottom strap passageway defined by the roof and the bottom head floor; and a tie body having a first end and a second end, wherein the first end of the tie body attaches to one of the top head floor and the bottom head floor.

2. The metal locking tie of claim 1, wherein the roof of the top head and the roof of the bottom head extend in opposite directions.

3. The metal locking tie of claim 1, wherein the top head floor having a dimple extending into the top strap passageway.

4. The metal locking tie of claim 3, wherein the tie body extends around a first bundle, into the top strap passageway, around a second bundle, and into the bottom strap passageway.

5. The metal locking tie of claim 3, wherein the top strap passageway is parallel to the bottom strap passageway.

6. The metal locking tie of claim 1, wherein the top head floor having a first portion and a second portion, and the bottom head floor having a first portion and a second portion, wherein the first portion of the top head floor is affixed to the first portion of the bottom head floor, and the second portion of the top head floor is spaced from the second portion of the bottom head floor defining a gap therebetween.

7. The metal locking tie of claim 6, further comprising a second metal locking tie, the second metal locking tie inserted through the gap to secure the dual head to a support.

8. The metal locking tie of claim 6, further comprising a second metal locking tie extending through the gap;

wherein the tie body extends through at least one of the top strap passageway and the bottom strap passageway; and wherein the second metal locking tie extending through the gap is perpendicular to the tie body extending through at least one of the top strap passageway or the bottom strap passageway.

9. The metal locking tie of claim 6, wherein the gap is perpendicular to the top strap passageway and the bottom strap passageway.

10. The metal locking tie of claim 1, wherein the roof of the top head extends in a first direction and the roof of the bottom head extends in a second direction, wherein the second direction is 180 degrees from the first direction.

\* \* \* \* \*